(12) United States Patent
Bettale et al.

(10) Patent No.: US 11,606,195 B2
(45) Date of Patent: Mar. 14, 2023

(54) METHOD OF VERIFYING INTEGRITY OF A PAIR OF CRYPTOGRAPHIC KEYS AND CRYPTOGRAPHIC DEVICE

(71) Applicant: IDEMIA FRANCE, Courvevoie (FR)

(72) Inventors: Luk Bettale, Courbevoie (FR); Rina Zeitoun, Courbevoie (FR); Franck Rondepierre, Courbevoie (FR); Christophe Giraud, Courbevoie (FR); Clémence Vermeersch, Courbevoie (FR)

(73) Assignee: IDEMIA FRANCE, Courbevoie (FR)

( * ) Notice: Subject to any disclaimer, the term of this patent is extended or adjusted under 35 U.S.C. 154(b) by 293 days.

(21) Appl. No.: 16/674,880

(22) Filed: Nov. 5, 2019

(65) Prior Publication Data
US 2020/0153617 A1   May 14, 2020

(30) Foreign Application Priority Data
Nov. 8, 2018 (FR) ...................... 1860300

(51) Int. Cl.
*H04L 9/08* (2006.01)
*H04L 9/14* (2006.01)
*H04L 9/30* (2006.01)

(52) U.S. Cl.
CPC .............. *H04L 9/0825* (2013.01); *H04L 9/14* (2013.01); *H04L 9/30* (2013.01)

(58) Field of Classification Search
CPC ............ H04L 9/0825; H04L 9/14; H04L 9/30
See application file for complete search history.

(56) References Cited

U.S. PATENT DOCUMENTS

| | | | |
|---|---|---|---|
| 6,959,091 B1* | 10/2005 | Sabin .................... | H04L 9/0894 380/44 |
| 7,231,040 B1* | 6/2007 | Collins ................ | G06Q 20/382 380/28 |
| 9,680,645 B2 | 6/2017 | Battistello et al. | |
| 2002/0039420 A1* | 4/2002 | Shacham ................ | G06F 7/723 380/277 |

(Continued)

FOREIGN PATENT DOCUMENTS

FR    3 015 079 A1   6/2015

OTHER PUBLICATIONS

"The ray attack, an inefficient trial to break RSA cryptosystems" by Andreas de Vries. Jul. 11, 2003. (Year: 2003).*

(Continued)

*Primary Examiner* — Theodore C Parsons
*Assistant Examiner* — Alan Lingqian Kong
(74) *Attorney, Agent, or Firm* — Nixon & Vanderhye

(57) ABSTRACT

Disclosed is a method of verifying integrity of a pair of public and private cryptographic keys within the additive group of the integers modulo N, with N being the product of two primary numbers p and q, the method including: calculating a candidate private exponent d' corresponding to a private exponent d of the private key; and executing a test of integrity. The test of integrity includes a step for verifying the coherence of the candidate private exponent d' with respect to a public exponent e of the public key and to the numbers p and q, the verification step involving a first multiple modulo of the public exponent e of the public key and a second multiple modulo of the public exponent e of the public key.

19 Claims, 3 Drawing Sheets

(56) References Cited

U.S. PATENT DOCUMENTS

| | | | |
|---|---|---|---|
| 2004/0125949 A1* | 7/2004 | Seifert | H04L 9/302 380/30 |
| 2004/0260931 A1* | 12/2004 | Fischer | G06F 17/10 713/176 |
| 2005/0084096 A1* | 4/2005 | Joye | G06F 7/723 380/28 |
| 2009/0110187 A1* | 4/2009 | Fischer | H04L 9/302 380/28 |
| 2017/0257211 A1* | 9/2017 | Vigilant | H04L 9/302 |

OTHER PUBLICATIONS

"Composite Numbers That Give RSA Key Pairs for Any Coprime p" by Barry Fagin. Aug. 28, 2018 (Year: 2018).*

"Recommendation for Pair-Wise Key-Establishment Schemes Using Integer Factorization Cryptography" by Elaine Barker et al., NIST Special Publication 800-56B, Sep. 2014 (Year: 2014).*

French Search Report, dated Jun. 27, 2019, from corresponding/related French Application No. 1860300.

Simon Burt, "Calculate primes p and q from private exponent (d), public exponent (e) and the modulus (n)", Feb. 26, 2012, retrieved from the internet: URL:https://stackoverflow.com/questions/2921406/calculate-primes-p-and-q-from-private-exponent-d-public-exponent-e-and-the.

Fgrieu, "RSA private key integrity check", Jan. 12, 2017, retrieved from the internet: URL:https://crypto.stackexchange.com/questions/42890/rsa-private-key-integrity-check.

Stefan Katzenbeisser, "Chapter 5: properties of the RSA cryptosystem", Recent Advances in RSA Cryptography, Jan. 1, 2001, pp. 63-67.

* cited by examiner

METHOD OF VERIFYING INTEGRITY OF A PAIR OF CRYPTOGRAPHIC KEYS AND CRYPTOGRAPHIC DEVICE

FIELD OF THE INVENTION

The invention is in the field of cyber-security. It relates, in particular, to the security of cryptographic methods implementing pairs of public and private keys.

CONTEXT OF THE INVENTION

Certain cryptographic systems implementing methods, such as for example the digital signature of a message or its encryption, require the generation of pairs of cryptographic keys. The public key is shared unencrypted by the cryptographic system with the systems addressees of the processed message whereas the private key is kept secret.

Since the generation of the pairs of public and private keys is a sensitive operation, test mechanisms are usually provided in order to verify their integrity.

For example, the American standard FIPS 140-2 published by NIST (for "National Institute of Standards and Technology") provides such a test (entitled "pair-wise consistency test").

In the case of cryptographic methods of the RSA ("Rivest Shamir Adelman") type, the pair of keys is obtained in the following manner.

In order to obtain p and q, two large primary numbers, the following two steps are repeated:
- obtain two candidate numbers p and q from numbers drawn randomly within the set $Z_N$ of the additive group of the integers modulo N, and
- test of the primality of the candidate p and q (for example according to a probabilistic test of primality of the Miller-Rabin type), for example according to the standard FIPS 140-λ, until a primary number is obtained.

The product of the numbers p and q thus forms a number N (N=p·q).

Subsequently, the number $\Phi(N)=(p-1)\cdot(q-1)$ is calculated ($\Phi$ being Euler's totient function, or just "totient").

The public key is subsequently formed by the numbers N and e, with e, "the public exponent", being an integer such that:

$$1<e<\Phi(N),$$

where e and $\Phi(N)$ are mutually primary (gcd(e, $\Phi(N)$)=1, where "gcd" stands for the "greatest common divisor").

The private key is, on the other hand, formed by the numbers N and d, with d, "the private exponent", being an integer such that:

$$d\cdot e=1 \bmod \lambda(N),$$

where $\lambda(N)$ is the least common multiplier (or "lcm") between p−1 and q−1 (i.e. $\lambda(N)$=lcm(p−1, q−1)).

The least common multiplier $\lambda(N)$ therefore verifies the following formula:

$$\lambda(N) = \frac{(p-1)\cdot(q-1)}{gcd(p-1, q-1)}$$

When the cryptographic method is an encryption of a message m (m belonging to $Z_N$), the test of integrity provided by the standard FIPS 140-2 may be summarized as follows:

1) the message m is encrypted with the public key so as to obtain an encrypted message $c=m^e \bmod N$,
λ) the encrypted message c is decrypted with the private key so as to obtain a decrypted message $m'=c^d \bmod N$, and
3) it is verified that the initial message m and the decrypted message are the same (m'=m).

When the cryptographic method is a signature of a message m (m belonging to $Z_N$), the test of integrity provided by the standard FIPS 140-2 may be summarized as follows:

1) the message m is signed with the private key so as to obtain a signature $s=(m)^d \bmod N$, (or alternatively $s=(H(m))^d$, H being a hash function),
λ) a value h' is calculated as $h'=s^e \bmod N$, and
3) it is verified that the value h' thus calculated and the message m are the same (or alternatively that the value h' and the condensate of the message by the hash function are the same (h'=H(m))).

However, the tests of integrity currently used do not allow certain errors in generation of pairs of keys to be detected.

Indeed, certain pairs of corrupted keys may pass the tests of integrity such as for example that described with reference to FIG. 1 of the application FR 3015080 or other tests of the prior art.

For example, if, instead of generating the private exponent d, a number d' is generated such that:
$d'\cdot e=1 \bmod (\lambda(N)/\alpha)$,
$1<\alpha$,
$\alpha$ divides $\lambda(N)$,
then it can happen that, for certain messages, the pair of keys with the numbers d' and e passes the test even though an error has occurred on the private exponent d.

In addition to being a source of errors for a cryptographic system using the keys, this can be a source of attacks by third parties with malicious intent.

For example, the number d' may be generated by mistake if the calculation of the least common multiplier of p−1 and q−1 (which should normally give $\lambda(N)$) is erroneous.

By causing the determination of the number d' instead of the number d, an attacker can thus recover one of the secret factors (p and q) of the number N such that N=p·q.

An attacker can thus interfere with the generation of keys and request the signature of random messages.

Thus, the tests of integrity currently used might not detect certain errors in generation of pairs of keys, notably during the aforementioned attacks.

Moreover, an attacker may cause errors in the calculation of the private exponent d by observing via an auxiliary channel the operation of the device implementing the generation of keys then by physical attack of the device in order to interfere with this operation. The attacker may for example use lasers in order to interfere with the device or else interfere with the electrical power supply of the latter.

The patent FR 1362833 provides a solution to these problems, consisting notably in repeating the test of integrity provided by the standard FIPS 140-2 a certain number of times on different messages. In order to reach a detection rate of at least 99%, the test must be repeated at least 14 times, which represents at least 21,532 modular multiplications.

According to the above, there exists therefore a need to improve the reliability of the methods for verifying the integrity of generation of pairs of keys in cryptographic systems whilst at the same time optimizing the cost in processing of these methods.

SUMMARY OF THE INVENTION

The aim of the present invention is thus to improve the reliability of the methods for verifying integrity of generation of pairs of keys in cryptographic systems.

In this context, a first aspect of the invention relates to a method of verifying the integrity of a pair of public and private cryptographic keys within the additive group of the integers modulo N, with N being the product of two primary numbers p and q, the method comprising:
- a step of calculating a candidate private exponent d' corresponding to a private exponent d of said private key
- a step of executing a test of integrity,
- said method being characterized in that the test of integrity comprises a step of verifying the coherence of the candidate private exponent d' with respect to a public exponent e of said public key and to the numbers p and q, said verification step involving a first multiple modulo (p−1) of the public exponent e of the public key and a second multiple modulo (q−1) of the public exponent e of the public key.

Thus, the method proposed allows a much higher detection rate to be achieved than with the test of integrity of the standard FIPS 140-2.

Indeed, the particular verification step of this method allows the majority of situations to be detected in which a bad private exponent d' has been calculated in place of the private exponent d since, in this case, at least one of the multiples of the public exponent e evaluated during the verification step would not have the expected value.

Advantageously, this new verification step only requires two additional modular multiplications with respect to the modular multiplications implemented during a test of integrity according to the standard FIPS 140-2.

The present method is therefore more effective and offers a better efficiency than the methods for verifying keys of the prior art consisting in implementing this test of integrity a large number of times.

According to a first embodiment, the verification step consists in verifying:
- on the one hand, that the product modulo (p−1) of the candidate private exponent d' and the public exponent e of the public key is equal to 1, and
- on the other hand, that the product modulo (q−1) of the candidate private exponent d' and the public exponent e of the public key is equal to 1.

According to a second embodiment, the step of calculating the candidate private exponent d' comprises the calculation:
- of a first value $d_p$ involving the public exponent e of the public key modulo p and
- of a second value $d_q$ involving the public exponent e of the public key modulo q,
- and in which said verification step (208) consists in verifying:
  - that the candidate private exponent d' modulo (p−1) is congruent to the first value $d_p$,
  - that the candidate private exponent d' modulo (q−1) is congruent to the second value $d_q$,
  - that the product modulo (p−1) of the first value $d_p$ and the public exponent e of the public key is equal to 1; and
  - that the product modulo (q−1) of the second value $d_q$ and the public exponent e of the public key is equal to 1.

This second embodiment allows the coherence between the first value $d_p$ (respectively the second value $d_q$) and the public exponent e to be tested immediately after having generated it, thus allowing the elimination of the value of the public exponent e from the memory prior to generating the values N and the candidate private exponent d'. The use of the memory is therefore optimized.

A second aspect of the invention relates to a method of testing the security of an electronic device with regard to an attack, said device implementing a generation of a public cryptographic key e and a private cryptographic key d within the additive group of the integers modulo N, such that:
- N=p·q, with p and q being primary numbers,
- 1<e<Φ(N), with e and Φ(N) being mutually primary and Φ(N)=(p−1)·(q−1), and
- d·e=1 mod λ(N), λ(N) being the least common multiplier between p−1 and q−1,
  - the method comprising a step of perturbation of the calculation of the value λ(N), so as to obtain, in place of the value λ(N), a value h'(N)=λ(N)/α, with α dividing λ(N), said perturbation leading to a private key d' being calculated, in place of the private key d, such that d'·e=1 mod λ(N)/α,
  - said method being characterized in that it furthermore comprises the steps of a verification method according to the aforementioned first aspect.

A method according to the second aspect allows electronic devices implementing a generation of pairs of keys to be tested, by verifying their reaction with regard to the perturbation of the calculation of the least common multiplier λ.

For example, a method according to the second aspect may be implemented in the industrial process for testing electronic devices implementing a generation of cryptographic keys, for example in a test laboratory. The perturbation step may thus allow a vulnerability in the resistance to an erroneous calculation of the value λ(N) to be updated.

A third aspect of the invention relates to a cryptographic device comprising a processing unit configured for implementing either of the methods according to the first or the second aspect.

A fourth aspect of the invention relates to a portable electronic entity comprising a device according to the third aspect.

The advantages, aims and particular features of the device and of the portable electronic entity are similar to those of the aforementioned methods that they implement.

In one particular embodiment, the various steps of the aforementioned methods are determined by instructions of computer programs.

Consequently, the invention is also aimed at computer programs on information media, these programs being able to be implemented by microprocessors, and comprising instructions adapted to the implementation of the steps of the aforementioned methods.

These programs may use any given programming language, and be in the form of source code, object code, or of code intermediate between source code and object code, such as in a partially compiled form, or in any other desired form.

The invention is also aimed at information media readable by a microprocessor, and comprising aforementioned instructions of computer programs.

The information media may be any given entity or device capable of storing the programs. For example, the media may comprise a storage means, such as a ROM, for example a microcircuit ROM, or else a magnetic recording means, for example a hard disk or else a flash memory.

On the other hand, the information media may be transmissible media such as electrical or optical signals, which may be channeled via an electrical or optical cable, by radio or by other means. The programs according to the invention may, in particular, be uploaded onto a storage platform of a network of the Internet type.

Alternatively, the information media may be integrated circuits into which the programs are incorporated, the circuits being adapted for executing or for being used in the execution of the methods in question.

The information media and the aforementioned computer program exhibit features and advantages analogous to the methods that they implement.

BRIEF DESCRIPTION OF THE FIGURES

Other features and advantages of the invention will furthermore become apparent in the description hereinafter, illustrated by the appended figures which illustrate non-limiting exemplary embodiments of it. In the figures.

DETAILED DESCRIPTION OF THE INVENTION

Figure 1:
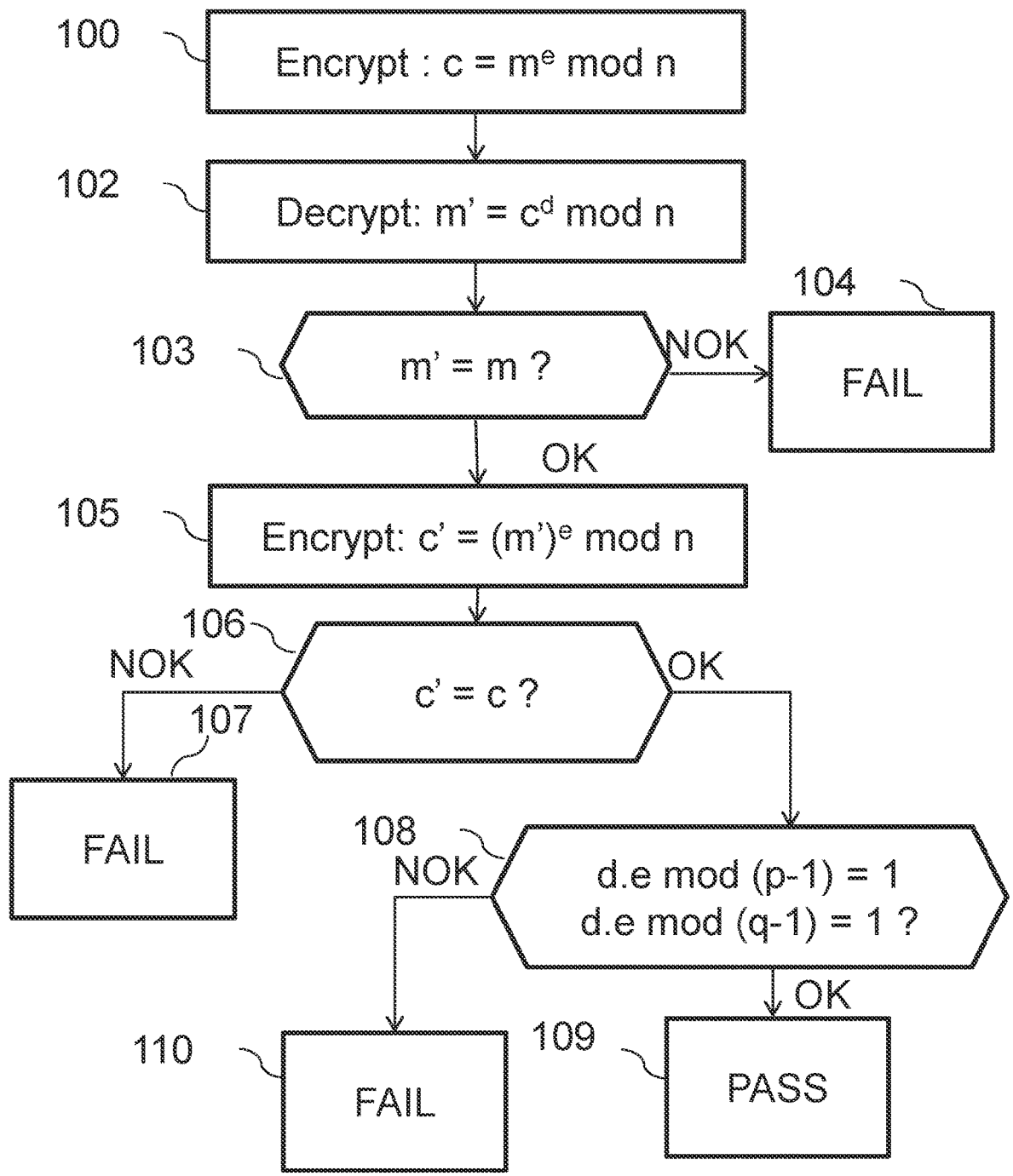
FIG. 1 illustrates a method of verifying integrity of keys according to a first embodiment of the invention.

FIG. 1 illustrates a method of verifying integrity of keys according to a first embodiment of the invention.

In this example, a public cryptographic key (e, N) and a private cryptographic key (d, N) are generated such that:

N=p·q, with p and q being primary numbers, $1 < e < \Phi(N)$ and e and $\Phi(N)$ are mutually primary (gcd(e, $\Phi(N)$)=1), with $\Phi(N)=(p-1)\cdot(q-1)$ ($\Phi$ being the Euler's totient function, or just "totient"), and $d_p = e^{-1}$ mod p and $d_q = e^{-1}$ mod q; and $d = CRT(d_p, d_q)$, where CRT is the result of the application of the 'Chinese Remainder Theorem'.

During a first step 100, a message m (m belonging to $Z_N$, the additive group of the integers modulo N) is encrypted with the public exponent e so as to obtain a first encrypted message $c = m^e$ mod N.

Subsequently, during a step 102, the encrypted message c is decrypted with the private exponent d so as to obtain a decrypted message $m' = c^d$ mod n.

It is subsequently verified, during a step 103, whether the initial message m and the decrypted message are the same (m'=m).

If this is not the case (NOK), it is determined during the step 104 that the pair of keys generated is corrupted.

If, on the other hand, the initial message m and the decrypted message are the same (OK), the decrypted message m' is encrypted, during a step 105, with the public exponent e so as to obtain a second encrypted message $c' = (m')^e$ mod n.

It is subsequently verified, during a step 106, whether the first encrypted message c and the second encrypted message c' are the same (c'=c).

If this is not the case (NOK), it is determined, during the step 107, that the pair of keys generated is corrupted.

If, on the other hand, the first encrypted message c and the second encrypted message c' are the same (OK), two other tests are implemented (step 108), in order to check that the private exponent d and the public exponent e verify the following relationships:

$d \cdot e \mod(p-1)=1$, and $d \cdot e \mod(q-1)=1$.

According to the well-known Chinese remainder theorem, the relationship $d \cdot e = 1$ mod $\lambda(N)$ is equivalent to the system of equations tested at the step 108, as long as the values p−1 and q−1 are uncorrupted, which is the case at this stage of the method because the corruption of these values would have been detected during the preceding steps 100 to 107.

This system of equations allows a situation in which a bad private exponent $d' = e^{-1}$ mod $(\lambda(N)/\alpha)$ has been calculated in place of the private exponent $d = e^{-1}$ mod $\lambda(N)$ to be detected. Indeed, since the value $\alpha$ divides $\lambda(N)$, the product of the value $\alpha$ and the largest common divisor between p−1 and q−1 do not divide both p−1 and q−1. Thus, at least one of the relationships in the step 108 is not verified when d' is calculated in place of d. It is noted here that the order of the tests carried out in the step 108 does not matter.

If these two relationships are verified (OK), it is determined, during the step 109, that the test of integrity is positive.

Otherwise (NOK), it is determined, during the step 110, that the pair of keys generated is corrupted.

This first embodiment allows the method to approach a detection rate of 100% by means of only two additional modular multiplications with respect to the modular multiplications implemented during a test of integrity according to the standard FIPS 140-λ. Thus, the efficiency of this solution is 10,000 times better than that of the solution described in the patent FR 1362833 where the test of integrity of the standard FIPS 140-2 is repeated several times, and which therefore requires many more modular multiplications in order to achieve a satisfactory detection rate.

Figure 2:
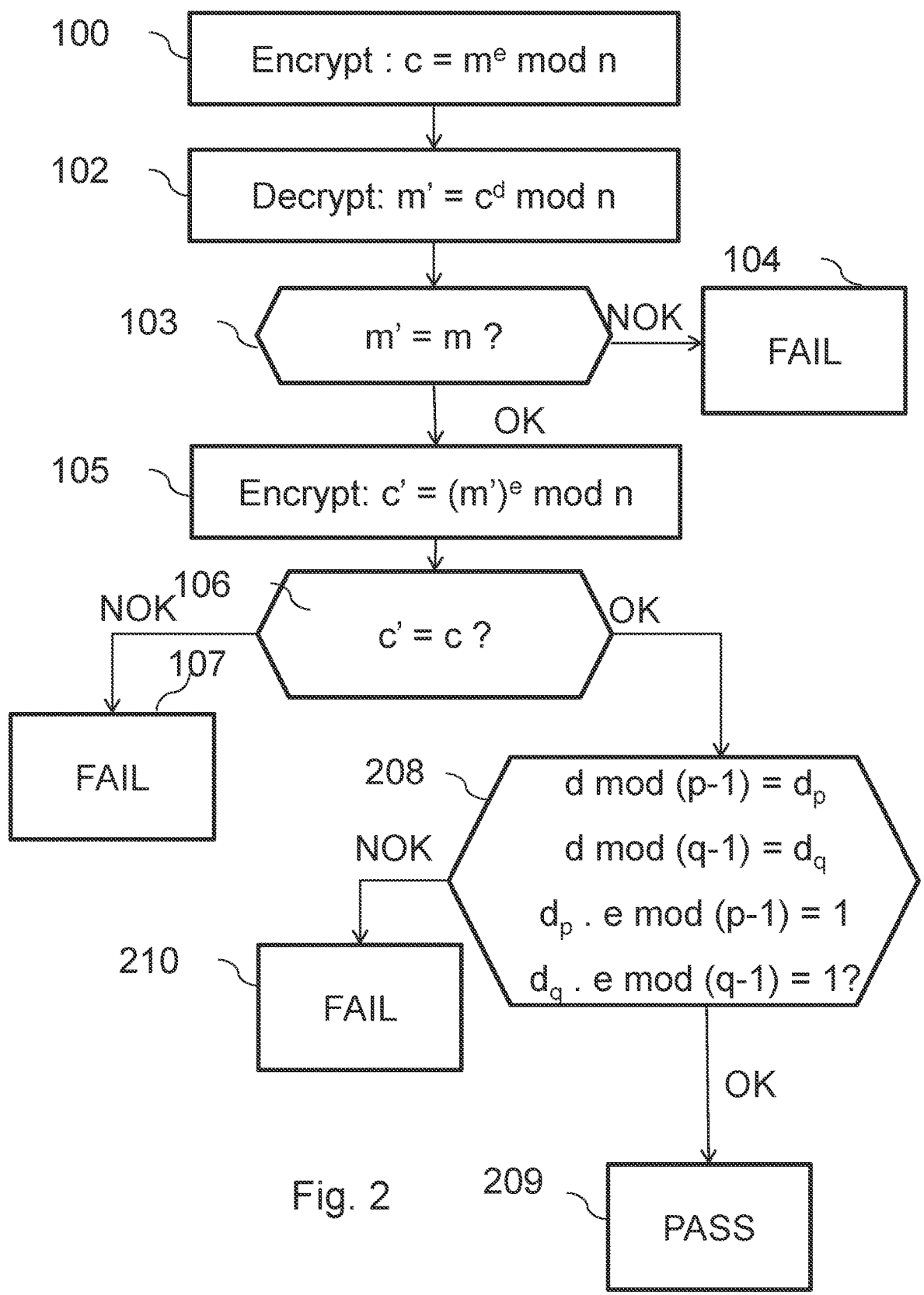
FIG. 2 illustrates a method of verifying integrity of keys according to a second embodiment of the invention.

FIG. 2 illustrates a method of verifying integrity of keys according to a second embodiment of the invention.

The steps 100 to 107 are identical to the steps of the first embodiment.

If the test 106 reveals that the first encrypted message c and the second encrypted message c' are the same (c'=c), then the method continues with a step 208 during which four tests are implemented, in order to verify that the value of the private exponent d and the public exponent e verify all of the following relationships:

$d \mod(p-1) = d_p$ $d \mod(q-1) = d_q$ $d_p \cdot e \mod(p-1) = 1$, and $d_q \cdot e \mod(q-1) = 1$.

It is noted here that the order of the tests carried out during the step 208 does not matter.

If these relationships are verified (OK), it is determined during the step 209 that the test of integrity is positive.

Otherwise (NOK), it is determined, during the step 210, that the pair of keys generated is corrupted.

This second embodiment allows the coherence between $d_p$ (respectively $d_q$) and e immediately after having generated them to be tested, thus allowing the elimination of the value of e from the memory prior to generating the values N and d. The use of the memory is therefore optimized.

In addition, just like the first embodiment, this second embodiment allows the method to approach a detection rate of 100% by means of only two additional modular multiplications with respect to the modular multiplications implemented during a test of integrity according to the standard FIPS 140-λ. Thus, the efficiency of this solution is 10,000 times better than that of the solution described in the patent FR 1362833, where the test of integrity of the standard FIPS 140-2 is repeated several times and hence requires many more modular multiplications in order to achieve a satisfactory detection rate.

Figure 3:
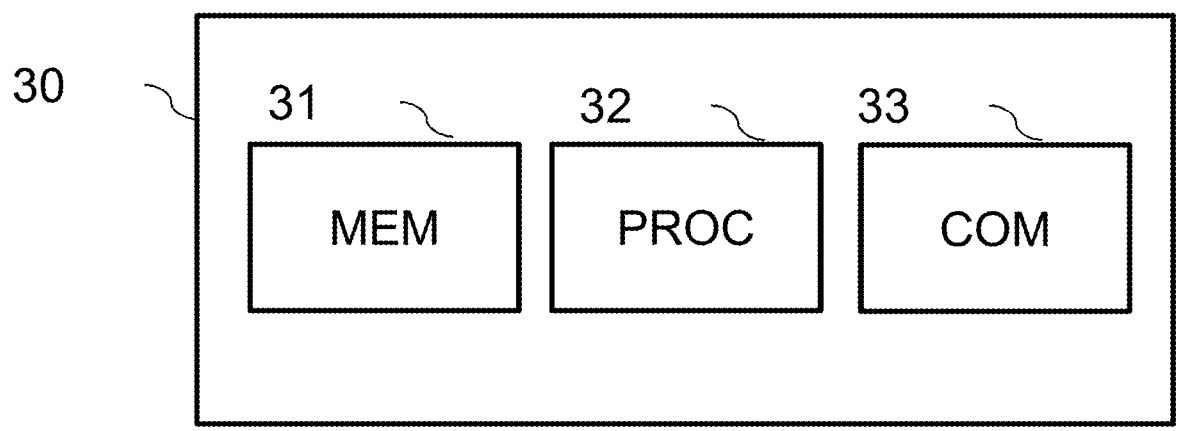
FIG. 3 illustrates schematically a device according to embodiments of the invention.

FIG. 3 illustrates schematically a device according to embodiments.

The device 30 in FIG. 3 comprises a memory unit 31 (MEM). This memory unit comprises a RAM memory for temporarily storing calculation data used during the implementation of a method according to the invention, according to various embodiments. The memory unit furthermore comprises a non-volatile memory (for example of the EEPROM type) for storing for example a computer program, according to one embodiment, for its execution by a processor (not shown) of a processing unit 32 (PROC) of the device.

The device furthermore comprises a communications unit 33 (COM), for example for exchanging data with another device according to embodiments. The exchanges of data between devices may take place according to the APDU (acronym for "Application Protocol Data Unit") protocol such as defined in the standard ISO 7816 part 4.

The communications unit may thus comprise an input/output interface capable of exchanging data according to this protocol. The data may be exchanged via APDU commands and responses to this type of command.

A device according to embodiments may conform to the standard ISO7816. This device may for example be a smart card or a secure element.

A device according to embodiments is for example an integrated circuit.

The present invention has been described and illustrated in the present detailed description with reference to the appended figures. However, the present invention is not limited to the embodiments presented. Other variants, embodiments and combinations of features may be deduced and implemented by those skilled in the art upon reading the present description and the appended figures.

For example, according to embodiments, the steps 108 and subsequent steps, respectively 208 and subsequent steps, may be implemented subsequent to the following signature verification steps:
the message m is signed with the private key so as to obtain a signature s=(m)$^d$ mod N, (or alternatively s=(H(m))$^d$, H being a hash function),
a value h' is calculated as h'=s$^e$ mod N, and
it is verified that the value h' thus calculated and the message m are the same (or alternatively that the value h' and the condensate of the message by the hash function are the same (h'=H(m))).

According to embodiments, the steps 108 and subsequent steps or 208 and subsequent steps are implemented following the test of integrity described in the US standard FIPS 140-2 published by NIST (acronym for "National institute of Standards and Technology"), and such as presented for example in the document "Donald L Evans et al.: "FIPS PUB 140-2: SECURITY REQUIREMENTS FOR CRYPTOGRAPHIC MODULES", FEDERAL INFORMATION PROCESSING STANDARDS PUBLICATION, 12 Mar. 2002".

These embodiments allow a detection rate of 100% to be approached by means of only a few additional modular multiplications with respect to the modular multiplications implemented during a test of integrity according to the standard FIPS 140-λ. Thus, the efficiency of this solution is much better than in a solution of the prior art consisting in repeating the test of integrity of the standard FIPS 140-2 numerous times.

For example, the tests in the step 108 or 208 come after:
at least a first step implementing one of the private or public keys and an initial test data value, said first step allowing a first result to be generated,
at least a second step implementing at least said first result and the key not used during the at least a first step, said second step allowing a second result to be generated, and
a comparison of said second result and of said initial test data value, the comparison being followed by the series of tests provided in the step 108 or 208.

According to one particular example, the tests in the step 108 or 208 come after:
at least a first step (for example one of the steps 100 or 102) for modular exponentiation of an initial test data value by one of the private or public keys, said first step allowing a first result to be generated,
at least a second step (for example one of the steps 102 or 105) for modular exponentiation of said first result by the key not used during the at least a first step, said second step allowing a second result to be generated, and
a comparison (for example either of the steps 103 or 106) of said second result and of said initial test data value, the comparison being followed by the series of tests provided at the step 108 or 208. In the claims, the term "comprising" does not exclude other elements or other steps. The indefinite article "a" does not exclude the plural. A single processor or several other units may be used for implementing the invention. The various features presented and/or claimed may be advantageously combined. Indeed, their presence in the description, or in different dependent claims, does not exclude the possibility of combining them. The reference signs should in no way be understood as limiting the scope of the invention.

The invention claimed is:
1. A verification method of verifying integrity of a pair of public and private keys within a group of integers, the groups of integers being an additive group of integers modulo N, with N being the product of two primary numbers p and q, the method comprising:
calculating an exponent that is a candidate private exponent d' corresponding to an exponent d, the exponent d being a private exponent of said private key;
executing a test of integrity comprising
processing an initial test data value using one of: (i) a public exponent e of the public key and (ii) the candidate private exponent d' to obtain a first result,
processing the first result using the other of: (i) the public exponent e of the public key and (ii) the candidate private exponent d' to obtain a second result,
comparing the initial test data value with the second result, and
verifying coherence of the candidate private exponent d' with respect to the public exponent e of said public key and the numbers p and q, the verifying using
a first multiple of the public exponent e of the public key, the first multiple being modulo (p−1), and
a second multiple of the public exponent e of the public key, the second multiple being modulo (q−1); and determining, using the first multiple of the public exponent e of the public key and the second multiple of the public exponent e of the public key, that the pair formed with the public key and the private key having the candidate private exponent d' is corrupted.

2. The verification method according to claim 1, wherein the verifying includes:
   verifying that the product modulo (p−1) of (i) the candidate private exponent d' and (ii) the public exponent e of the public key is equal to 1, and
   verifying that the product modulo (q−1) of (i) the candidate private exponent d' and (ii) the public exponent e of the public key is equal to 1.

3. The verification method according to claim 1, wherein the calculating the candidate private exponent d' comprises:
   calculating a first value $d_p$ using the public exponent e of the public key modulo p and
   calculating a second value $d_q$ involving the public exponent e of the public key modulo q, and
   the verifying comprises:
   verifying that the candidate private exponent d' modulo (p−1) is congruent to the first value $d_p$,
   verifying that the candidate private exponent d' modulo (q−1) is congruent to the second value $d_q$,
   verifying that the product modulo (p−1) of: (i) the first value $d_p$ and (ii) the public exponent e of the public key is equal to 1, and
   verifying that the product modulo (q−1) of: (i) the second value $d_q$ and (ii) the public exponent e of the public key is equal to 1.

4. A testing method of testing security of an electronic device with regard to an attack, the testing method comprising:
   the verification method according to claim 1, said device implementing generation of the public key and the private key within the additive group of the integers modulo N, such that:
   $1<e<\Phi(N)$, with e and $\Phi$) (N) being mutually primary and $\Phi(N)=(p-1)\cdot(q-1)$, and
   $d\cdot e=1 \bmod \lambda(N)$, $\lambda(N)$ being the least common multiplier between p−1 and q−1; and
   perturbation of calculation of the value $\lambda(N)$ to obtain, in place of the value $\lambda(N)$, a value $\lambda'(N)=\lambda(N)/\alpha$, with $\alpha$ dividing $\lambda(N)$, said perturbation leading to calculating the candidate private exponent d', in place of the private exponent d, such that $d'\cdot e=1 \bmod \lambda(N)/\alpha$.

5. A non-transitory computer-readable medium on which is stored a computer program comprising instructions to carry out the verification method according to claim 1 when the computer program is loaded and executed by a processor of a device.

6. A device comprising:
   a processor configured to implement the verification method according to claim 1.

7. A portable electronic entity comprising:
   the device according to claim 6.

8. A testing method of testing security of an electronic device with regard to an attack, the testing method comprising:
   the verification method according to claim 2, said device implementing generation of the public key and the private key within the additive group of the integers modulo N, such that:
   $1<e<\Phi(N)$, with e and $\Phi(N)$ being mutually primary and $\Phi(N)=(p-1)\cdot(q-1)$, and
   $d\cdot e=1 \bmod \lambda(N)$, $\lambda(N)$ being the least common multiplier between p−1 and q−1; and
   perturbation of calculation of the value $\lambda(N)$ to obtain, in place of the value $\lambda(N)$, a value $\lambda'(N)=\lambda(N)/\alpha$, with $\alpha$ dividing $\lambda(N)$, said perturbation leading to calculating the candidate private exponent d', in place of the private exponent d, such that $d'\cdot e=1 \bmod \lambda(N)/\alpha$.

9. A testing method of testing security of an electronic device with regard to an attack, the testing method comprising:
   the verification method according to claim 3, said device implementing generation of the public key and the private key within the additive group of the integers modulo N, such that:
   $1<e<\Phi(N)$, with e and $\Phi(N)$ being mutually primary and $\Phi(N)=(p-1)\cdot(q-1)$, and
   $d\cdot e=1 \bmod \lambda(N)$, $\lambda(N)$ being the least common multiplier between p−1 and q−1; and
   perturbation of calculation of the value $\lambda(N)$ to obtain, in place of the value $\lambda(N)$, a value $\lambda'(N)=\lambda(N)/\alpha$, with $\alpha$ dividing $\lambda(N)$, said perturbation leading to calculating the candidate private exponent d', in place of the private exponent d, such that $d'\cdot e=1 \bmod \lambda(N)/\alpha$.

10. A non-transitory computer-readable medium on which is stored a computer program comprising instructions to carry out the verification method according to claim 2 when the computer program is loaded and executed by a processor of a device.

11. A non-transitory computer-readable medium on which is stored a computer program comprising instructions to carry out the verification method according to claim 3 when the computer program is loaded and executed by a processor of a device.

12. A non-transitory computer-readable medium on which is stored a computer program comprising instructions to carry out the verification method according to claim 4 when the computer program is loaded and executed by a processor of a device.

13. A non-transitory computer-readable medium on which is stored a computer program comprising instructions to carry out the verification method according to claim 8 when the computer program is loaded and executed by a processor of a device.

14. A non-transitory computer-readable medium on which is stored a computer program comprising instructions to carry out the verification method according to claim 9 when the computer program is loaded and executed by a processor of a device.

15. Cryptographic A device comprising:
    a processor configured to implement the verification method according to claim 2.

16. A device comprising:
    a processor configured to implement the verification method according to claim 3.

17. A device comprising:
    a processor configured to implement the verification method according to claim 4.

18. A device comprising:
    a processor configured to implement the verification method according to claim 8.

19. A device comprising:
    a processor configured to implement the verification method according to claim 9.

* * * * *